United States Patent
Kuraoka (10) Patent No.: US 12,347,207 B2
(45) Date of Patent: Jul. 1, 2025

(54) VEHICLE EXTERNAL ENVIRONMENT RECOGNITION APPARATUS

(71) Applicant: SUBARU CORPORATION, Tokyo (JP)

(72) Inventor: Minoru Kuraoka, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 405 days.

(21) Appl. No.: 17/940,579

(22) Filed: Sep. 8, 2022

(65) Prior Publication Data

US 2023/0086937 A1 Mar. 23, 2023

(30) Foreign Application Priority Data

Sep. 21, 2021 (JP) ................................. 2021-153608

(51) Int. Cl.
*G06V 20/58* (2022.01)
*G06T 7/12* (2017.01)
(Continued)

(52) U.S. Cl.
CPC ................ *G06V 20/58* (2022.01); *G06T 7/12* (2017.01); *G06V 10/70* (2022.01); *G06V 10/98* (2022.01);
(Continued)

(58) Field of Classification Search
CPC ........ G06V 20/58; G06V 10/70; G06V 10/98; G06V 20/64; G06V 2201/08; G06V 10/751; G06V 10/762; G06T 7/12; G06T 2207/20228; G06T 2207/30252; G06T 2207/10021; G06T 2207/10028; G06T 2207/20084; G06T 7/11
See application file for complete search history.

(56) References Cited

U.S. PATENT DOCUMENTS 6,477,260 B1 * 11/2002 Shimomura .............. G06T 7/74
 382/106
8,983,187 B2 * 3/2015 Cheng ...................... G06T 5/00
 382/167

(Continued)

FOREIGN PATENT DOCUMENTS

JP 3349060 B2 11/2002

OTHER PUBLICATIONS

Aliaksei Makarau, Haze Detection and Removal in Remotely Sensed Multispectral Imagery, DOI: 10.1109/TGRS.2013.2293662, published Jan. 2, 2014 (Year: 2014).*

(Continued)

*Primary Examiner* — Molly Wilburn
*Assistant Examiner* — Jordan McKenzie Elliott
(74) *Attorney, Agent, or Firm* — Rimon P.C.

(57) ABSTRACT

A vehicle external environment recognition apparatus includes at least one processor, and at least one memory coupled to the at least one processor. The at least one processor is configured to operate in cooperation with at least one program stored in the at least one memory to execute processing. The processing includes generating a distance image from luminance images, specifying, by using semantic segmentation, a floating matter class in the luminance images, and invalidating parallax associated with floating pixels that are included in the distance image and belong to the floating matter class.

17 Claims, 8 Drawing Sheets

(51) Int. Cl.
  *G06V 10/70*  (2022.01)
  *G06V 10/98*  (2022.01)
  *G06V 20/64*  (2022.01)

(52) U.S. Cl.
  CPC .... *G06V 20/64* (2022.01); *G06T 2207/20228* (2013.01); *G06T 2207/30252* (2013.01); *G06V 2201/08* (2022.01)

(56) References Cited

U.S. PATENT DOCUMENTS

| | | | | |
|---|---|---|---|---|
| 9,224,055 | B2* | 12/2015 | Kido | G06V 20/584 |
| 9,672,446 | B1* | 6/2017 | Vallespi-Gonzalez | |
| | | | | H04N 13/239 |
| 9,706,186 | B2* | 7/2017 | Shibazaki | H04N 13/218 |
| 9,911,340 | B2* | 3/2018 | Samarasekera | G06V 20/176 |
| 11,656,629 | B1* | 5/2023 | Armstrong-Crews | |
| | | | | G01S 17/88 |
| | | | | 701/25 |
| 2005/0072907 | A1* | 4/2005 | Pallaro | G08G 1/096716 |
| | | | | 348/E7.086 |
| 2006/0239509 | A1* | 10/2006 | Saito | G06V 10/753 |
| | | | | 701/1 |
| 2010/0040300 | A1* | 2/2010 | Kang | G06T 5/40 |
| | | | | 382/255 |
| 2013/0088578 | A1* | 4/2013 | Umezawa | G06V 20/588 |
| | | | | 348/47 |
| 2014/0132769 | A1* | 5/2014 | Kido | G06V 20/584 |
| | | | | 382/104 |
| 2015/0332103 | A1* | 11/2015 | Yokota | G06F 16/5854 |
| | | | | 348/149 |
| 2015/0334269 | A1* | 11/2015 | Yokota | H04N 23/60 |
| | | | | 382/103 |
| 2017/0158237 | A1* | 6/2017 | Sakamoto | B60W 30/10 |
| 2018/0274915 | A1* | 9/2018 | Tsurumi | G01C 11/30 |
| 2019/0100215 | A1* | 4/2019 | Ishigami | B60W 30/09 |
| 2020/0026283 | A1* | 1/2020 | Barnes | G06V 10/774 |
| 2020/0118280 | A1* | 4/2020 | Inata | G08G 1/09626 |
| 2020/0184250 | A1* | 6/2020 | Oko | G06V 20/56 |
| 2020/0309923 | A1* | 10/2020 | Bhaskaran | G01S 17/87 |
| 2021/0248718 | A1* | 8/2021 | Yu | G06T 5/77 |
| 2021/0312589 | A1* | 10/2021 | Moriuchi | G06T 3/4007 |
| 2021/0364360 | A1* | 11/2021 | Hosaka | G01J 5/0806 |
| 2022/0018964 | A1* | 1/2022 | Horiba | H04N 23/56 |
| 2022/0264022 | A1* | 8/2022 | Tsuji | H04N 23/617 |
| 2023/0182732 | A1* | 6/2023 | Horita | G01S 17/931 |
| | | | | 701/93 |

OTHER PUBLICATIONS

Ren et al, Deep Video Dehazing With Semantic Segmentation, 2019 (Year: 2019).*

* cited by examiner

VEHICLE EXTERNAL ENVIRONMENT RECOGNITION APPARATUS

CROSS-REFERENCE TO RELATED APPLICATIONS

The present application claims priority from Japanese Patent Application No. 2021-153608 filed on Sep. 21, 2021, the entire contents of which are hereby incorporated by reference.

BACKGROUND

The disclosure relates to a vehicle external environment recognition apparatus that is to be mounted on a vehicle to identify a specific object located in a direction in which the vehicle is headed.

Known techniques, such as those disclosed in Japanese Patent No. 3349060, have been developed to help vehicles to detect vehicles ahead of them with a view to enabling each vehicle to escape severe damage from a collision with a vehicle ahead of it or with a view to enabling each vehicle to keep a safe distance from a vehicle ahead of it by follow-up control.

SUMMARY

An aspect of the disclosure provides a vehicle external environment recognition apparatus. The vehicle external environment recognition apparatus includes at least one processor and at least one memory coupled to the at least one processor. The at least one processor is configured to operate in cooperation with at least one program stored in the at least one memory to execute processing. The processing includes generating a distance image from luminance images, specifying, by using semantic segmentation, a floating matter class in the luminance images, and invalidating parallax associated with floating pixels that are included in the distance image and belong to the floating matter class.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to describe the principles of the disclosure.

DETAILED DESCRIPTION

A vehicle occasionally encounters a water vapor mass floating over a road in a cold climate area or a high-altitude area. In some cases, a vehicle encounters a buildup of exhaust fumes emitted through an exhaust pipe of a vehicle ahead of it when the exhaust fumes stay over a road for a while before diffusing in the atmosphere. Floating matter, such as the water vapor mass or the buildup of exhaust fumes, is recognized as a three-dimensional object by the vehicle in receipt of images in which the floating matter is seen. The vehicle can misidentify the floating matter as a specific object (e.g., a vehicle or a pedestrian) ahead of it. If the vehicle misidentifies the specific object, stop control or floating matter as a deceleration control would be performed to avoid a collision between the vehicle and the floating matter. This impairs the riding comfort of the vehicle and can cause a collision between the vehicle and a vehicle behind it.

It is desirable to provide a vehicle external environment recognition apparatus that improves the accuracy of detecting floating matter.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Vehicle External Environment Recognition System 100

Figure 1:
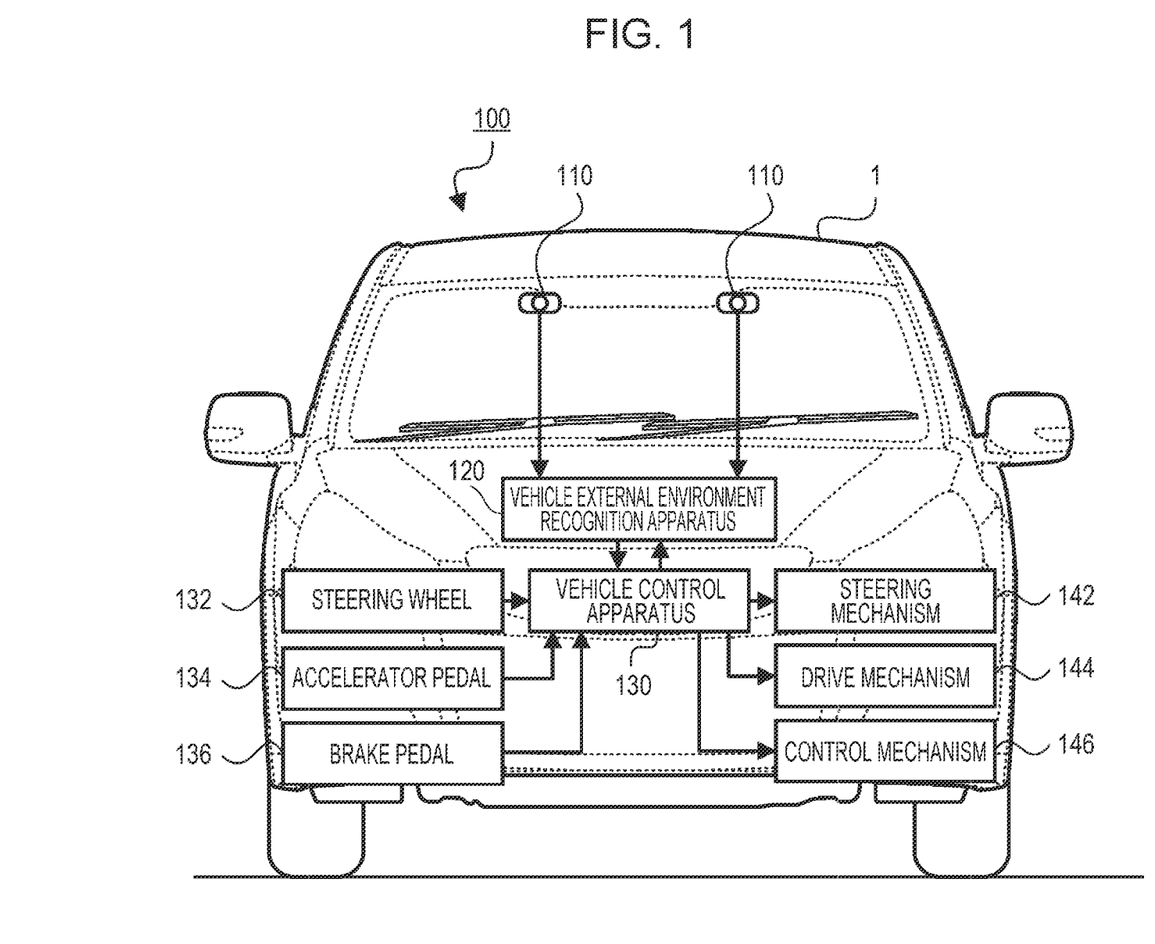
FIG. 1 is a block diagram illustrating coupling between constituent elements of a vehicle external environment recognition system.

FIG. 1 is a block diagram illustrating coupling between constituent elements of a vehicle external environment recognition system 100. The vehicle external environment recognition system 100 includes two imaging apparatuses 110, a vehicle external environment recognition apparatus 120, and a vehicle control apparatus 130.

The imaging apparatuses 110 each include an imaging device, such as a charge-coupled device (CCD) or a complementary metal-oxide semiconductor (CMOS). The imaging apparatuses 110 are each capable of capturing an image of the external environment ahead of a vehicle 1 and generating a luminance image that includes information on luminance. For example, the luminance image is a color (RGB) image or a monochrome (gray-scale) image. The two imaging apparatuses 110 are arranged side by side substantially in a horizontal direction with a space therebetween at the front of the vehicle 1 in such a manner that their respective optical axes are substantially in parallel. The imaging apparatuses 110 each capture an image of a three-dimensional object in a detection region ahead of the vehicle 1 and generate a luminance image of the object consecutively. For example, the frame duration is set to $1/60$ seconds.

The vehicle external environment recognition apparatus 120 recognizes the environment outside the vehicle 1 on the basis of images such as luminance images acquired from the imaging apparatuses 110 and a distance image generated from two luminance images. The environment outside the vehicle 1 is hereinafter simply referred to as "external environment". The vehicle external environment recognition apparatus 120 then controls the speed and the steering angle of the vehicle 1 on the basis of the recognition of the external environment and the traveling condition of the vehicle 1. The vehicle external environment recognition apparatus 120 will be described in detail later.

The vehicle control apparatus 130 is configured as an electronic control unit (ECU). The vehicle control apparatus 130 accepts operation inputs performed on a steering wheel 132, an accelerator pedal 134, and a brake pedal 136 by the driver and controls a steering mechanism 142, a drive mechanism 144, and a control mechanism 146 on the basis of information generated by the vehicle external environment recognition apparatus 120.

Vehicle External Environment Recognition Apparatus 120

Figure 2:
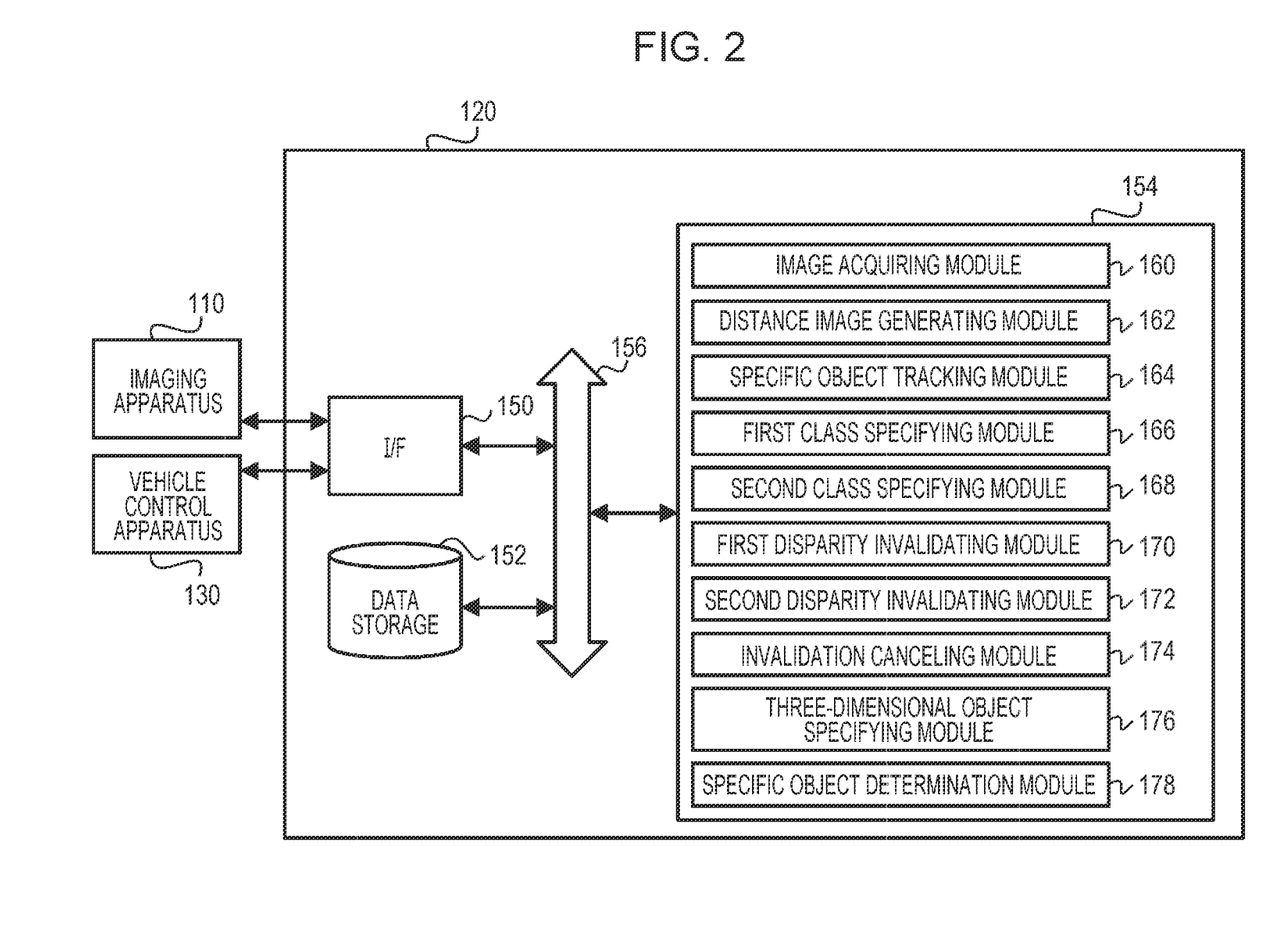
FIG. 2 is a functional block diagram schematically illustrating the functions of a vehicle external environment recognition apparatus.

FIG. 2 is a functional block diagram schematically illustrating the functions of the vehicle external environment recognition apparatus 120. Referring to FIG. 2, the vehicle external environment recognition apparatus 120 includes an interface (I/F) 150, a data storage 152, and a central control unit 154.

The I/F 150 enables exchange of information between each imaging apparatus 110 and the vehicle control apparatus 130. The data storage 152 includes, for example, random-access memory (RAM), flash memory, and a hard disk drive (HDD) and stores various kinds of information for use in processing carried out by functional modules that will be described below.

The central control unit 154 is configured as a semiconductor integrated circuit including, for example, a processor, ROM, and RAM. Programs are stored in the ROM. The RAM is a work area. The central control unit 154 controls the I/F 150 and the data storage 152 through a system bus 156. The processor included in the central control unit 154 in the present embodiment operates in cooperation with the programs stored in the ROM to implement functional modules, such as an image acquiring module 160, a distance image generating module 162, a specific object tracking module 164, a first class specifying module 166, a second class specifying module 168, a first disparity invalidating module 170, a second disparity invalidating module 172, an invalidation canceling module 174, a three-dimensional object specifying module 176, and a specific object determination module 178. In this disclosure, "disparity" may rephrase "parallax".

The central control unit 154 dictated by the functional modules determines the shapes of three-dimensional objects and their relative distances in luminance images and a distance image and then identifies a certain three-dimensional object as a specific object (e.g., a vehicle ahead of the vehicle 1). The central control unit 154 thus enables the vehicle 1 to escape severe damage from a collision with a vehicle ahead of it or to keeping a safe distance from a vehicle ahead of it by follow-up control.

The three-dimensional object recognized on the basis of the luminance images and the distance images is not necessarily an object of interest in terms of collision avoidance. Although floating matter, such as water vapor or exhaust fumes staying over a road, may be seen in the luminance images, the vehicle 1 does not need to avoid a collision with the floating matter. That is, there is no problem with the vehicle 1 plowing its way into the floating matter. Examples of the floating matter include: water vapor that is in the form of a gas converted from liquid state; and smoke that is a mass made of minute solid or liquid particles and is a product of the combustion of a flammable substance.

If the central control unit 154 misidentifies the floating matter as a specific object, automatic emergency braking (AEB) would work in such a way as to subject the vehicle 1 to stop control or deceleration control. This impairs the riding comfort of the vehicle 1 and can cause a collision between the vehicle 1 and a vehicle behind it. The present embodiment is to improve the accuracy of detecting floating matter with a view to controlling the vehicle 1 properly.

The following describes an external environment recognition procedure, which is a distinctive feature of the present embodiment. The vehicle external environment recognition procedure includes: extracting a three-dimensional object located ahead of the vehicle 1; and identifying a specific object (e.g., a vehicle ahead of the vehicle 1) and/or floating matter (e.g., water vapor). Workings of the functional modules constituting the central control unit 154 will also be described in detail in relation to the vehicle external environment recognition procedure.

Vehicle External Environment Recognition Procedure

Figure 3:
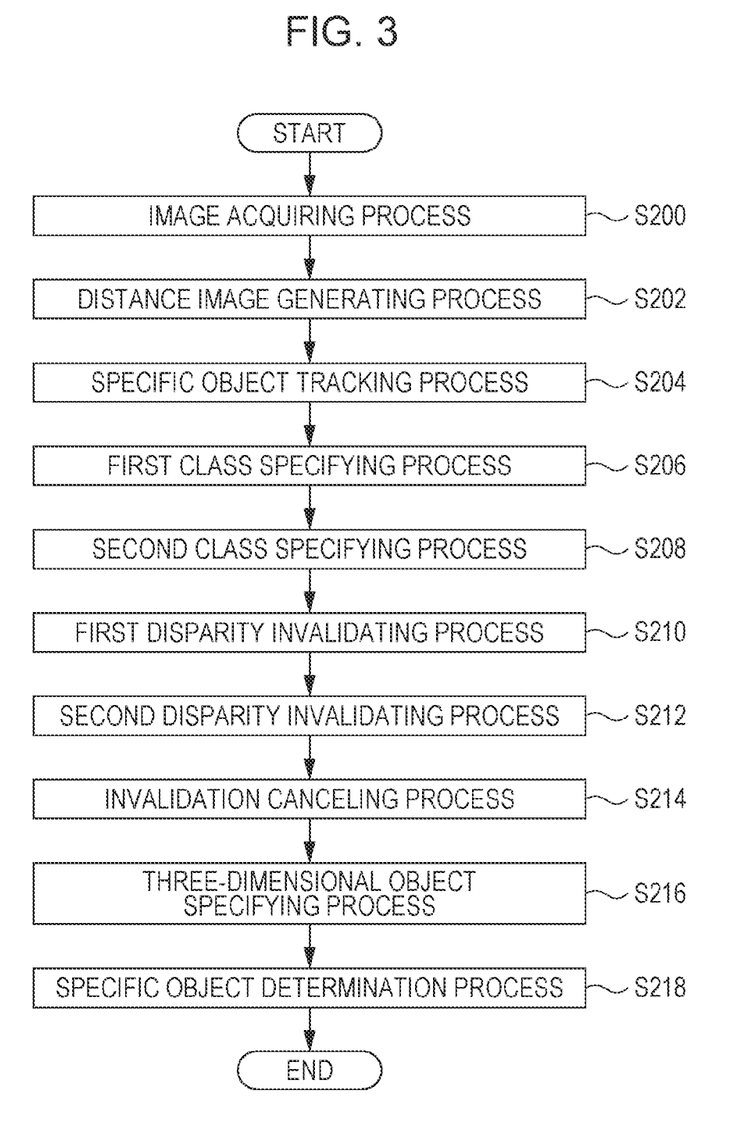
FIG. 3 is a flowchart of a procedure for recognizing external environment.

FIG. 3 is a flowchart of a vehicle external environment recognition procedure. The vehicle external environment recognition apparatus 120 executes the vehicle external environment recognition procedure periodically (upon lapse of a predetermined interrupt period). The vehicle external environment recognition procedure starts with acquisition of luminance images by the image acquiring module 160 (S200). The distance image generating module 162 generates a distance image from two luminance images (S202). With a three-dimensional object being identified as a specific object in the previous frame, the specific object tracking module 164 determines the position of the three-dimensional object in the current frame (S204). The first class specifying module 166 specifies or identifies, by using semantic segmentation, predetermined classes in the luminance images (S206). The second class specifying module 168 specifies, by using semantic segmentation, a floating matter class in the luminance images (S208). The first disparity invalidating module 170 invalidates the disparity associated with floating pixels in the distance image (S210). The floating pixels are pixels belonging to the floating matter class. The second disparity invalidating module 172 invalidates the disparity associated with neighboring pixels in the distance image (S212). The neighboring pixels are pixels located within a predetermined distance from the floating pixels. The invalidation canceling module 174 cancels the invalidation of disparity associated with the neighboring pixels when the neighboring pixels satisfy a predetermined cancellation condition (S214). The three-dimensional object specifying module 176 specifies a three-dimensional object on the basis of the luminance images and the distance image in which the disparity associated with some pixels is invalidated (S216). The specific object determination module 178 determines whether the three-dimensional object is a specific object (S218).

The vehicle external environment recognition procedure except for processing irrelevant to the features of the present embodiment will be described in detail below.

Image Acquiring Process S200

Figure 4:
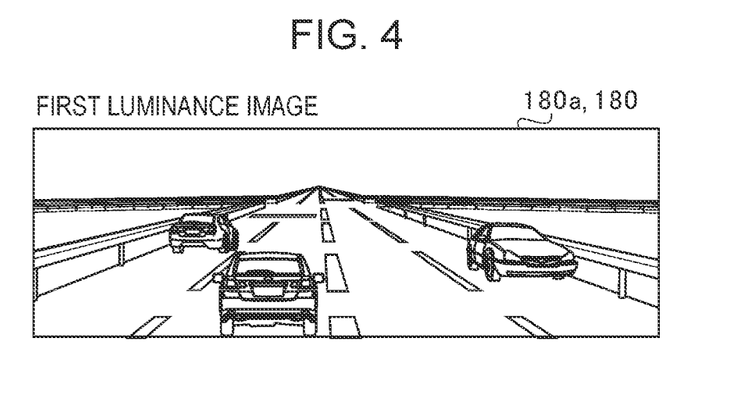
FIGS. 4 and 5 are explanatory drawings for describing luminance images.
Figure 5:
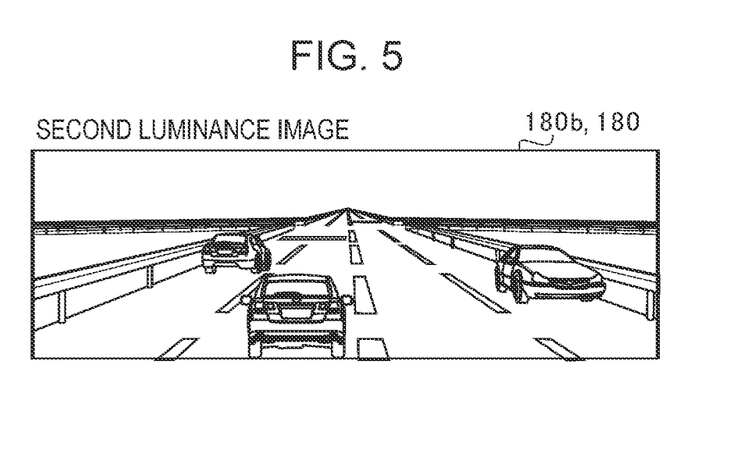
Figure 6:
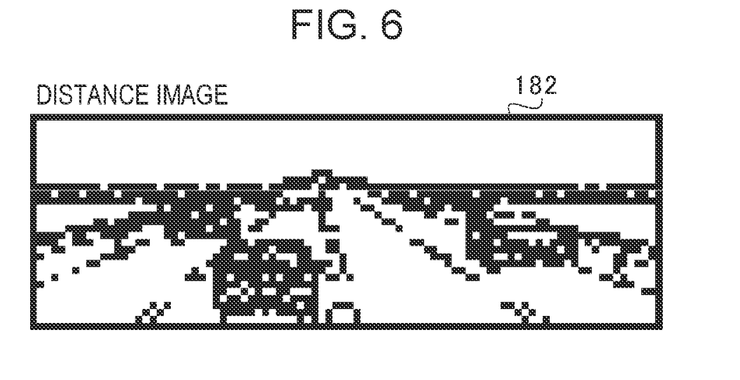
FIG. 6 is an explanatory drawing for describing a distance image.

FIGS. 4 and 5 are explanatory drawings for describing luminance images. FIG. 6 is an explanatory drawing for describing a distance image. The image acquiring module 160 acquires images captured by the imaging apparatuses 110, whose optical axes do not coincide with each other. For example, the image acquiring module 160 acquires two luminance images 180. The luminance images 180 acquired by the image acquiring module 160 include a first luminance image 180a in FIG. 4 and a second luminance image 180b in FIG. 5. The first luminance image 180a is captured by the imaging apparatus 110 that is closer to the right side of the vehicle 1 than to the left side of the vehicle 1. The second luminance image 180b is captured by the imaging apparatus 110 that is closer to the left side of the vehicle 1 than to the right side of the vehicle 1.

Referring to FIGS. 4 and 5, each three-dimensional object in the first luminance image 180a and the corresponding object in the second luminance image 180b are not in positional agreement with each other in the horizontal direction. This is due to the positional difference between the imaging apparatuses 110, which capture images at their respective positions. The term "horizontal" herein refers to the right-and-left direction of the image area of each captured image, and the term "vertical" herein refers to the up-and-down direction of the image area of each captured image.

Distance Image Generating Process S202

The distance image generating module 162 generates a distance image from images acquired by the image acquiring module 160. Referring to FIG. 6, a distance image 182 is generated from the first luminance image 180a in FIG. 4 and the second luminance image 180b in FIG. 5 such that distances can be determined with regard to objects of interest.

For example, the distance image generating module 162 employs pattern matching to derive disparity information including disparity and image positions. The term "image positions" herein refer to the positions of blocks in an image. A block is freely selected from the blocks constituting one of the luminance images, and the distance image generating module 162 searches the other luminance image for a block corresponding to the freely selected block. For example, a block is freely selected from the first luminance image 180a, and the distance image generating module 162 then searches the second luminance image 180b for a block corresponding to the freely selected block. Each block may be a 4- by 4-pixel matrix with four horizontal rows and four vertical columns. Pixels in a block from which disparity information is derived are effective pixels having the derived disparity information. Pixels in a block from which no disparity information is derived do not have disparity information.

Examples of functions that may be used in pattern matching to assess the degree of agreement between blocks include: a similarity measure based on sum of absolute difference (SAD) in which differences in luminance are taken; a similarity measure based on sum of squared intensity difference (SSD) in which the differences are squared; and a similarity measure based on normalized cross correlation (NCC) in which the degree of similarity is determined for variances obtained by subtracting a mean luminance value from the luminance of each pixel.

In this way, the distance image generating module 162 derives disparity on a block-by-block basis. For example, all of the blocks seen in a detection region of 600×200 pixels undergo the disparity derivation. Each block is not necessarily a 4- by 4-pixel matrix and may include any desired number of pixels.

Although the distance image generating module 162 is capable of deriving disparity on a block-by-bock basis, that is, with a detection resolution of one block, the distance image generating module 162 is unable to identify a three-dimensional object to which the blocks belong. Thus, the disparity information is not derived for each three-dimensional object and is derived with the detection resolution in the detection region. For example, the disparity information is derived for each block on an individual basis. For convenience, the blocks from which disparity is derived are indicated by black dots in FIG. 6.

The distance image generating module 162 derives positional information by using stereo vision, where the disparity information derived from the distance image 182 on a block-by-block basis is converted to a relative distance (z) to determine the position in three dimensions. The positional information includes a horizontal distance (x), a vertical distance (y), and the relative distance (z). The stereo vision is the process of determining the relative distance between a block of interest and each imaging apparatus 110. The relative distance is determined by using triangulation on the basis of the disparity associated with the block. With regard to the distance image 182, the terms "disparity" and "relative distance" may both refer to the distance in the depth direction.

The vehicle external environment recognition apparatus 120 recognizes the external environment on the basis of the luminance images 180 and the distance image 182 acquired as above and identifies a three-dimensional object located ahead of the vehicle 1 as a specific object (e.g., a vehicle ahead of the vehicle 1).

Specific Object Tracking Process S204

The specific object tracking module 164 estimates the position of a three-dimensional object identified as a specific object in the previous frame by the specific object determination module 178, which will be described later. The specific object tracking module 164 estimates the position of the three-dimensional object in the current frame on the basis of the position of the three-dimensional object in the distance image 182 and the speed. In a case where a three-dimensional object whose size, shape, and color arrangement are similar to those of the specific object is in or close to the estimated position, the specific object tracking module 164 identifies the three-dimensional object with the specific object identified in the previous frame. This enables follow-up control, where the specific object tracking module 164 tracks the specific object located ahead of the vehicle 1. The specific object tracking module 164 may carry out the processing by using various known techniques such as machine learning, which will not be further elaborated here.

First Class Specifying Process S206

The first class specifying module 166 specifies, by using semantic segmentation, predetermined classes in the luminance images 180.

Semantic segmentation is a deep learning algorithm that associates pixels in the luminance images 180 with labels, categories, or classes in accordance with what each pixel signifies as an image and on the basis of the degree of certainty that the pixel is relevant to the label, category, or class concerned.

Although the first luminance image 180a and/or the second luminance image 180b can be partially unclear, semantic segmentation enables the vehicle external environment recognition apparatus 120 to recognize a cluster of pixels belonging to a certain characteristic class (e.g., a vehicle class representing vehicles) as an integral whole. Semantic segmentation may be implemented by using various known techniques and will not be fully dealt with in the following description, which will be given while focusing on the features involved in the present embodiment.

Figure 7:
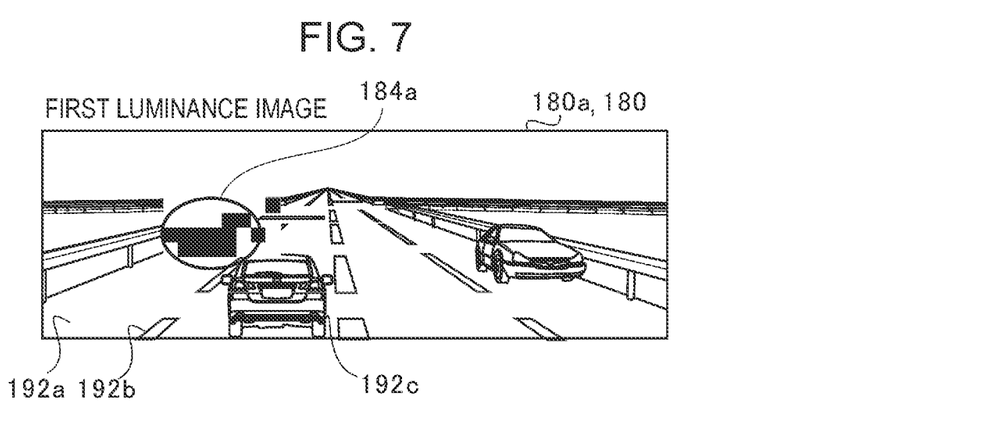
FIGS. 7 and 8 are explanatory drawings for describing the necessity of semantic segmentation.
Figure 8:
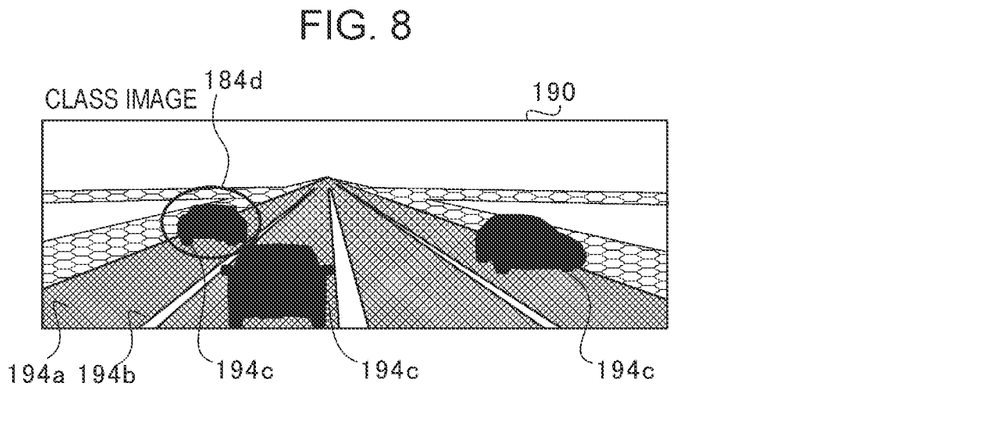

FIGS. 7 and 8 are explanatory drawings for describing the necessity of semantic segmentation. The first class specifying module 166 performs classification by applying semantic segmentation to the first luminance image 180a in FIG. 7, and as a result, a class image 190 in FIG. 8 is generated. For example, the first class specifying module 166 associates each pixel in the first luminance image 180a with a class selected from the group consisting of a road surface class, a lane line class, a vehicle class, a sidewalk class, a fence class, a pole class, a traffic cone class, a roadside tree class, and a sky class.

Every pixel in the first luminance image 180a is analyzed by the first class specifying module 166, which determines the probability of the pixel belonging to these classes. The probability of a pixel belonging to a class of interest is hereinafter referred to as the degree of certainty. The first class specifying module 166 associates a pixel of interest in the first luminance image 180a with the class endowed with the highest degree of certainty. A road surface 192a, a lane line 192b, and a vehicle 192c are illustrated in first luminance image 180a in FIG. 7. A road surface class 194a, a lane line class 194b, and a vehicle class 194c are illustrated in the class image 190 in FIG. 8. In a case where a pixel of interest in the first luminance image 180a is associated with the road surface 192a with the highest degree of certainty, the pixel is classified as the road surface class 194a. In a case where a pixel of interest in the first luminance image 180a is associated with the lane line 192b with the highest degree of certainty, the pixel is classified as the lane line class 194b. In a case where a pixel of interest in first luminance image 180a is associated with the vehicle 192c with the highest degree of certainty, the pixel is classified as the vehicle class 194c.

Referring to FIG. 7, a section denoted by 184a in the first luminance image 180a is unclear due to raindrops. Semantic segmentation enables the first class specifying module 166 to overcome such an inconvenience; that is, a section denoted by 184d in the class image 190 is properly classified as the vehicle class 194c, as illustrated in FIG. 8. In this way, a vehicle ahead of the vehicle 1 is correctly identified by the first class specifying module 166.

A mean value or a median value of the degrees of certainty that are determined with regard to pixels classified as the same class may be regarded as the degree of certainty for all the pixels belonging to the class. The first class specifying module 166 may perform classification by using the mean value or the median value.

Second Class Specifying Process S208

The second class specifying module 168 specifies, by using semantic segmentation, a certain class in each luminance image 180. For example, the floating matter class representing floating matter that is a specific object is specified on the basis of the degree of certainty of being the floating matter. Both the first class specifying module 166 and the second class specifying module 168 use semantic segmentation. Unlike the first class specifying module 166, the second class specifying module 168 specifies only the floating matter class.

Figure 9:
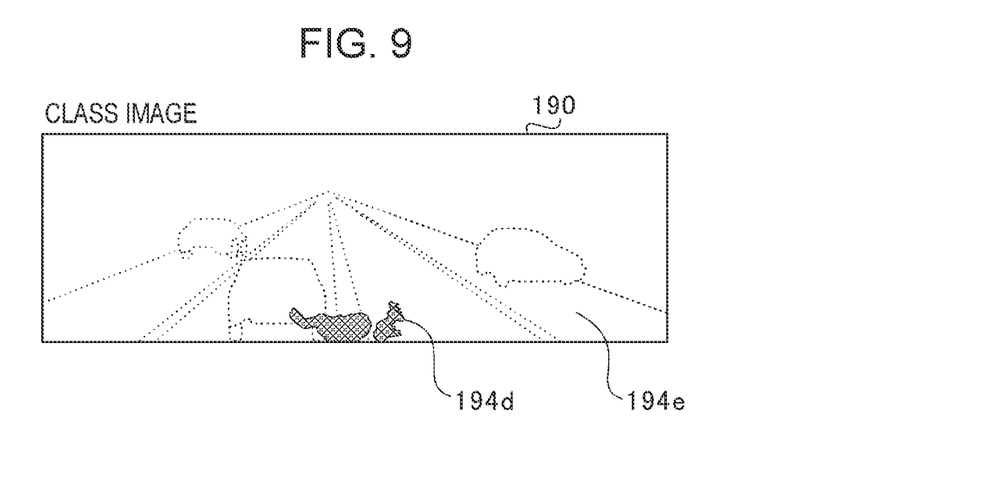
FIG. 9 is an explanatory drawing for describing a floating matter class.

FIG. 9 is an explanatory drawing for describing the floating matter class. The second class specifying module 168 differentiates the floating matter class from other classes; that is, the second class specifying module 168 determines whether a pixel of interest belongs to the floating matter class. In the example illustrated in FIG. 9, the second class specifying module 168 specifies a floating matter class 194d, which is crosshatched in FIG. 9. The regions other than the crosshatched region are regarded as a class 194e, which is different from the floating matter class 194d. Unlike the classification in FIG. 8, the classification performed by the second class specifying module 168 does not deal with many classes; that is, the second class specifying module 168 determines only whether a pixel of interest belongs to the floating matter class 194d. The second class specifying module 168 is thus able to specify floating matter more accurately than the first class specifying module 166 does.

As described above, the first class specifying module 166 and the second class specifying module 168 operate independently of each other, and floating matter is identified by using the floating matter class 194d specified by the second class specifying module 168. In a case where the floating matter class 194d is one of the classes to be specified by the first class specifying module 166 and can be specified with a satisfactory degree of accuracy, the floating matter class 194d specified by the first class specifying module 166 may be adopted in the present embodiment. This eliminates the processing that is otherwise carried out by the second class specifying module 168 such that the processing load will be lightened.

The specific object tracking module 164, the first class specifying module 166, and the second class specifying module 168 are implemented by the central control unit 154. In some embodiments, these modules are implemented by a separate computing engine or field-programmable gate array (FPGA) that is specifically designed for artificial intelligence (AI) or deep neural network (DNN). Similarly, other functional modules in the present embodiment may be implemented by a separate computing engine or FPGA that is specifically designed for AI or DNN.

First Disparity Invalidating Process S210

The first disparity invalidating module 170 invalidates the disparity associated with floating pixels in the distance image. The floating pixels are pixels that are classified as the floating matter class 194d by the second class specifying module 168. The disparity invalidation means that a valid value indicative of disparity associated with a pixel of interest is not regarded as disparity, for the purpose of specifying objects of interest in the vehicle external environment recognition procedure. The disparity in itself is not eliminated. The reason for this is that disparity associated with floating pixels will be used by the second disparity invalidating module 172, which will be described later.

The disparity associated with pixels classified as the floating matter class 194d by the second class specifying module 168 are invalidated. This is taken to mean that no three-dimensional object is located in the position corresponding to the pixels. Thus, the central control unit 154 is prevented from misidentifying floating matter (e.g., water vapor or exhaust fumes) as a specific object (e.g., a vehicle ahead of the vehicle 1). This eliminates the possibility that the central control unit 154 will perform stop control or deceleration control to avoid a collision with the floating matter misidentified as a specific object. The riding comfort of the vehicle 1 is maintained accordingly. This also eliminates or reduces the possibility that a vehicle behind the vehicle 1 will come into collision with the vehicle 1.

Second Disparity Invalidating Process S212

Floating matter does not have a uniform density, and the background can be seen through part of it. Thus, there is no guarantee that the floating matter will be classified as the floating matter class 194d. For example, floating matter having a low density with the background visible therethrough can be classified as the class 194e, which is different from the floating matter class 194d. If the floating matter is classified as the class 194e, which is different from the floating matter class 194d, the region classified as the class 194e would be recognized as an object of interest in terms of collision avoidance, and the vehicle 1 would be subjected to stop control or deceleration control. As a workaround, the vehicle external environment recognition apparatus 120 recognizes pixels close to the floating pixels as floating matter.

The second disparity invalidating module 172 invalidates the disparity associated with neighboring pixels. The neighboring pixels are pixels within a predetermined distance from the floating pixels belonging to the floating matter class 194d. The disparity in itself is not eliminated. The reason for this is that disparity associated with floating pixels will be used by the invalidation canceling module 174, which will be described later.

Figure 10:
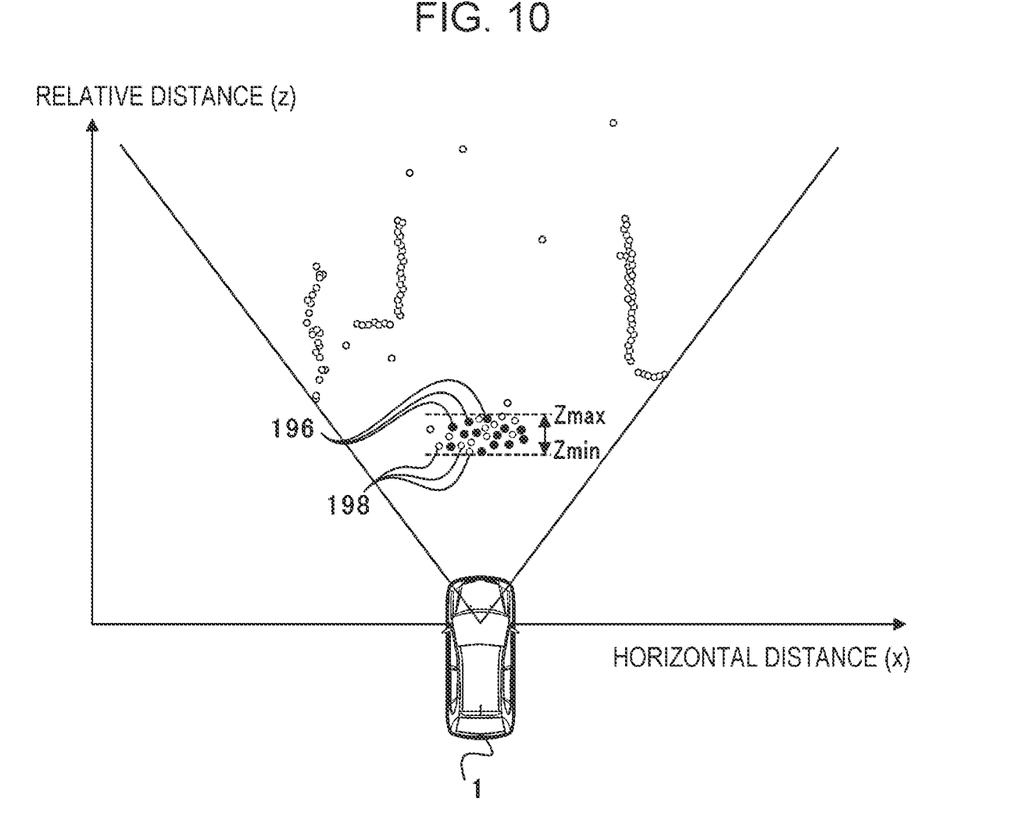
FIGS. 10 and 11 are explanatory drawing for describing the processing that is to be carried out by a second disparity invalidating module.
Figure 11:
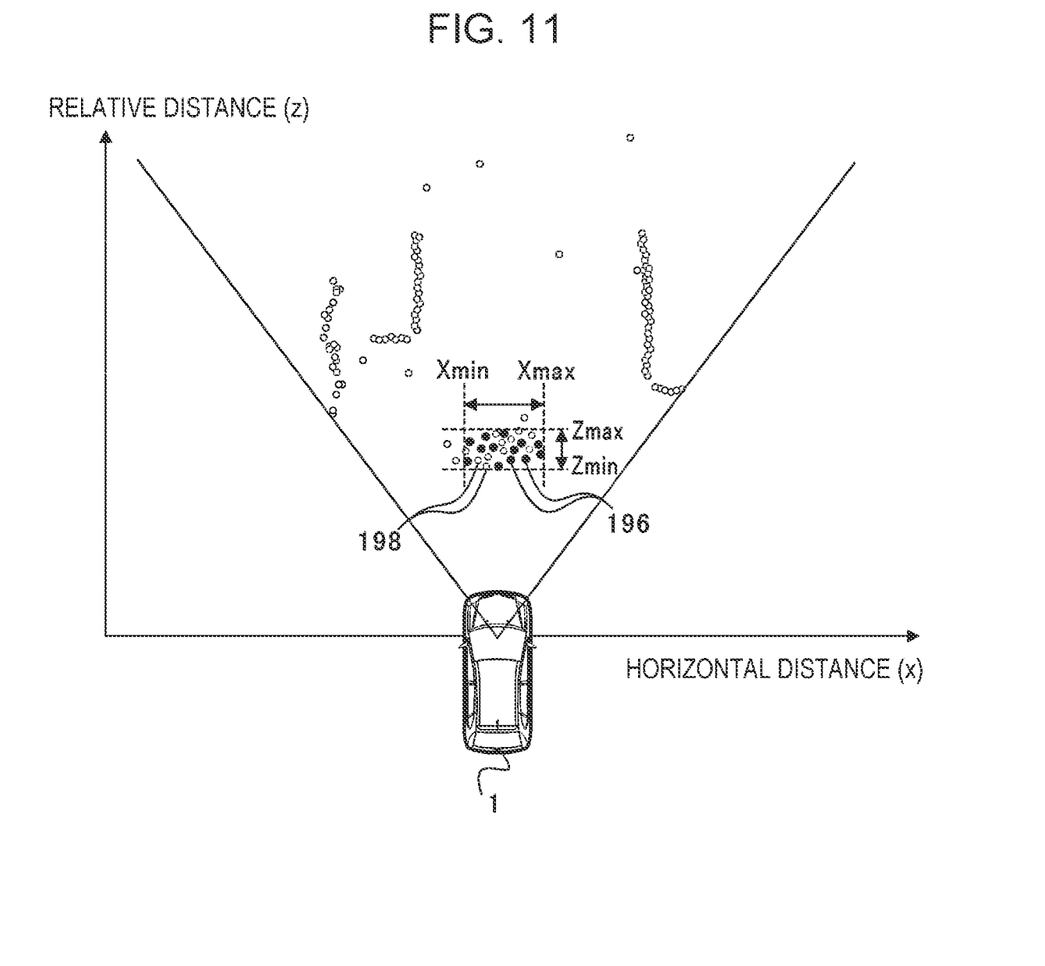

FIGS. 10 and 11 are explanatory drawings for describing the processing that is to be carried out by the second disparity invalidating module 172. Referring to FIG. 10, pixels with disparity in the distance image 182 are plotted on the zx-plane, where z and x denote the relative distance and the horizontal distance, respectively. Each pixel is indicated by a white or black dot in FIG. 10.

Assume that floating matter is seen in the distance image 182. In the distance image 182 in FIG. 10, disparity is found with regard to floating pixels 196, which are indicated by black dots and belong to the floating matter class 194d. The floating pixels 196 are concentrated in a certain region on the zx plane in FIG. 10.

Some of the pixels around the floating pixels 196 on the zx-plane are not classified as the floating matter class 194d. The pixels are close to only the floating pixels 196 and are not close to any other specific object (e.g., a vehicle). Thus, it is highly likely that the pixels correspond to floating matter. The second disparity invalidating module 172 determines that the pixels within a predetermined distance from the floating pixels 196 are neighboring pixels 198, which are highly likely to correspond to floating matter. The disparity associated with the neighboring pixels 198 is invalidated by the second disparity invalidating module 172 as in the case of the disparity associated with the floating pixels 196.

For example, the second disparity invalidating module 172 calculates Zmin and Zmax, as illustrated in FIG. 10. Zmin and Zmax denote the minimum value and the maximum value, respectively, of the relative distance (z) between the vehicle 1 and the floating pixels 196. Pixels that are located between points corresponding to the minimum value Zmin and the maximum value Zmax and that are not the floating pixels 196 are recognized as the neighboring pixels 198 by the second disparity invalidating module 172, which then invalidates the disparity associated with the neighboring pixels 198.

The processing above may be altered as will be described below. The second disparity invalidating module 172 calculates Zmin, Zmax, Xmin, and Xmax, as illustrated in FIG. 11. Zmin and Zmax denote the minimum value and the maximum value, respectively, of the relative distance (z) between the vehicle 1 and the floating pixels 196. Xmin and Xmax denote the left end and the right end, respectively, of a line segment corresponding to the horizontal distance (x) between the vehicle 1 and the floating pixels 196. Pixels that are located between points corresponding to the minimum value Zmin and the maximum value Zmax and between points corresponding to the left end Xmin and the right end Xmax and that are not the floating pixels 196 are recognized as the neighboring pixels 198 by the second disparity invalidating module 172, which then invalidates the disparity associated with the neighboring pixels 198.

In some embodiments, pixels in the region in which the floating pixels 196 are located are recognized as the neighboring pixels 198 on the basis of each pixel's position in three dimensions, that is, the position defined by the horizontal distance (x), the vertical distance (y), and the relative distance (z). In a case where the Euclidean distance between the pixel of interest and the floating pixels 196 (V (horizontal distance$^2$+vertical distance$^2$+relative distance$^2$)) falls within a predetermined range, the pixel is recognized as the neighboring pixel 198 by the second disparity invalidating module 172, which then invalidates the disparity associated with the pixel. Alternatively, pixels within a predetermined distance (e.g., 2 m) from the center of the region in which the floating pixels 196 are located may be recognized as the neighboring pixels 198. Still alternatively, pixels within a predetermined distance (e.g., 2 m) from the mean value of all the floating pixels 196, that is, from the center of gravity of the floating pixels 196 may be recognized as the neighboring pixels 198.

Pixels regarded as floating matter include not only the floating pixels 196 belonging to the floating matter class 194d but also the neighboring pixels 198 that are close to the floating pixels 196. This enables invalidation of disparity associated with the neighboring pixels 198 that ought to be recognized as floating matter. Thus, the vehicle external environment recognition apparatus 120 is prevented from misidentifying the floating matter (e.g., water vapor or exhaust fumes) as a specific object (e.g., a vehicle ahead of the vehicle 1).

For convenience, an example has been described in which the second disparity invalidating module 172 starts carrying out the processing after the completion of the processing carried out by the first disparity invalidating module 170. In actuality, the first disparity invalidating module 170 extracts pixels in the detection region on a one-by-one basis. In a case where a pixel of interest belongs to the floating matter class 194d, the first disparity invalidating module 170 recognizes the pixel as the floating pixel 196 and then invalidates the disparity associated with the pixel. The second disparity invalidating module 172 extracts, on a one-by-one basis, pixels within a predetermined neighboring range where the floating pixels 196 having undergone disparity invalidation. In a case where a pixel of interest is located within a predetermined distance from the floating pixels 196 and is not the floating pixel 196, the second disparity invalidating module 172 recognizes the pixel as the neighboring pixel 198 and invalidates the disparity associated with the pixel. That is, the first disparity invalidating module 170 and the second disparity invalidating module 172 operate concurrently in such a manner that the second disparity invalidating module 172 carries out the processing in accordance with the result of processing carried out by the first disparity invalidating module 170. The neighboring range is defined by a predetermined number of horizontal pixels and a predetermined number of vertical pixels in the luminance image 180, where the center of the neighboring range corresponds to the floating pixels 196 having undergone disparity invalidation.

Invalidation Canceling Process S214

Simply invalidating the disparity associated with the pixels that are close to the floating pixels 196 can result in the following consequences.

The second disparity invalidating module 172 can possibly misidentify, as floating matter, a three-dimensional object that is close to the floating pixels 196 and is not the floating matter. In a case where another vehicle is located ahead of floating matter, the second disparity invalidating module 172 can possibly recognize, as floating matter, pixels corresponding to the vehicle.

In such a case, the second disparity invalidating module 172 invalidates disparity associated with pixels that ought to be recognized as a specific object. The vehicle external environment recognition apparatus 120, which is supposed to enable the vehicle 1 to escape severe damage from a collision with the vehicle ahead of it or to keep a safe distance from a vehicle ahead of it by follow-up control, is not able to carry out such processing when encountering a specific object. As a workaround, the invalidation canceling module 174 strictly determines whether the neighboring pixels 198 correspond to any other specific object.

The invalidation canceling module 174 determines whether the neighboring pixels 198 having undergone the disparity invalidation performed by the second disparity invalidating module 172 each satisfy a predetermined cancellation condition. The invalidation canceling module 174 then cancels the invalidation of disparity associated with the neighboring pixels 198 that satisfy the predetermined condition. That is, the disparity associated with the pixels concerned are validated.

In a case where pixels recognized as the neighboring pixels 198 can possibly correspond to a specific object (i.e., a vehicle ahead of the vehicle 1), the disparity associated with the neighboring pixels 198 are not invalidated. If the vehicle 1 misidentifies a vehicle ahead of it as floating matter, the vehicle 1 would come into collision with the vehicle ahead of it. Avoiding such situations deserves higher priority than preventing the vehicle 1 from misidentifying floating matter as a vehicle ahead of the vehicle 1 and from being erroneously subjected to stop control or deceleration control.

Figure 12:
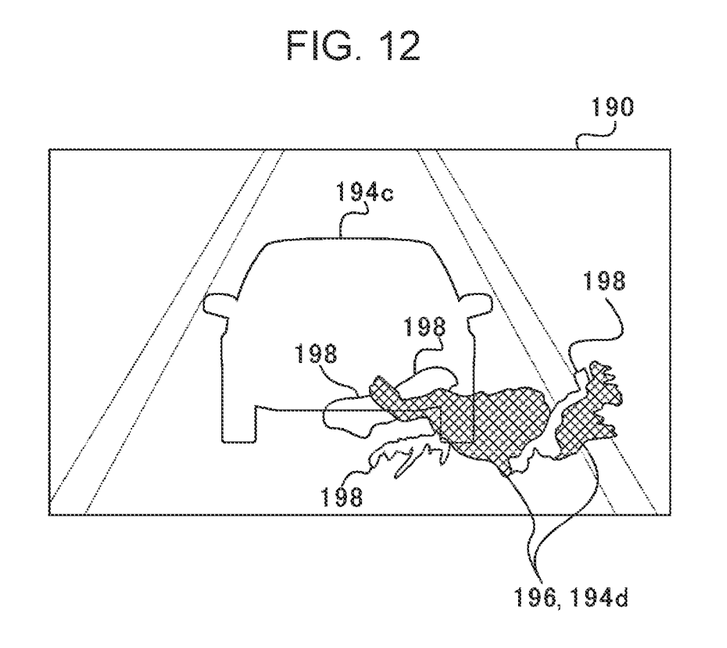
FIGS. 12 and 13 are explanatory drawings for describing the operation of an invalidation canceling module.
Figure 13:
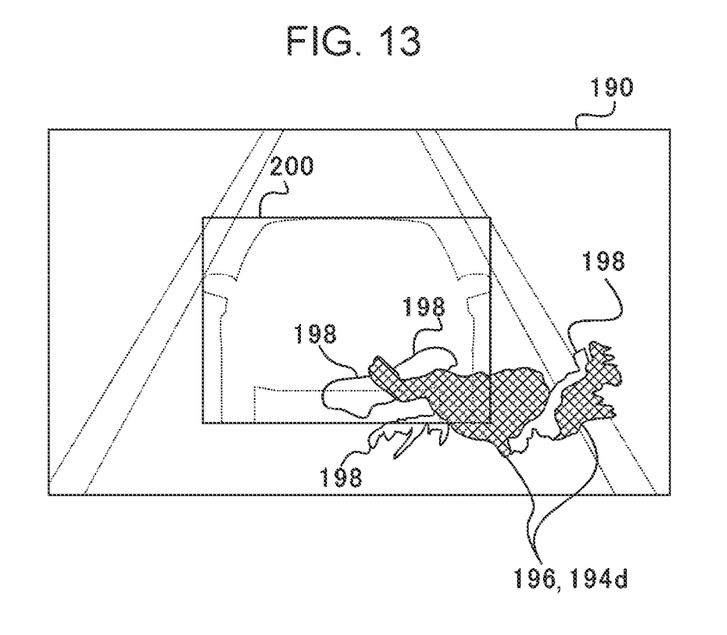

FIGS. 12 and 13 are explanatory drawings for describing the operation of the invalidation canceling module 174. The second class specifying module 168 specifies the floating matter class 194d, which is crosshatched in FIG. 12. The first disparity invalidating module 170 specifies the floating pixels 196 belonging to the floating matter class 194d. The second disparity invalidating module 172 specifies the neighboring pixels 198 within a predetermined distance from the floating pixels 196. The neighboring pixels 198 are pixels close to the floating pixels 196 and are not the floating pixels 196. The neighboring pixels 198 can possibly be pixels that are classified as the vehicle class 194c by the first class specifying module 166.

In a case where the pixels recognized as the neighboring pixels 198 by the second disparity invalidating module 172 are pixels classified as the vehicle class 194c by the first class specifying module 166, the invalidation canceling module 174 cancels the invalidation of disparity associated with the neighboring pixels 198 concerned. FIG. 12 illustrates an example in which the neighboring pixels 198 overlap the vehicle class 194c. In this case, the invalidation canceling module 174 cancels the invalidation of disparity associated with the neighboring pixels 198 concerned.

As mentioned above, the specific object tracking module 164 estimates the position of a three-dimensional object identified as a vehicle in the previous frame. Referring to FIG. 13, the specific object tracking module 164 estimates the position of the three-dimensional object in the current frame on the basis of the position of three-dimensional object in the distance image 182 and the speed. Once the specific object tracking module 164 estimates the position of a vehicle ahead of the vehicle 1, the specific object tracking module 164 regards the vehicle as a region 200, which has a rectangular shape defined by vertical lines passing through horizontal ends of the vehicle and horizontal lines passing through vertical ends of the vehicle. This enables the vehicle external environment recognition apparatus 120 to properly determine the size of the vehicle ahead of the vehicle 1. Dealing with such a simple shape lightens the processing load.

Once the vehicle ahead of the vehicle 1 is regarded as the region 200 by the specific object tracking module 164, the invalidation canceling module 174 cancels the invalidation of disparity associated with the pixels that are located in the region 200 and recognized as the neighboring pixels 198 by the second disparity invalidating module 172. FIG. 13 illustrates an example in which the neighboring pixels 198 overlap the region 200. With the vehicle ahead of the vehicle 1 being regarded as the region 200, the invalidation canceling module 174 cancels the invalidation of disparity associated with the neighboring pixels 198.

The invalidation canceling module 174 cancels the invalidation of disparity associated with the neighboring pixels 198 when (i) the neighboring pixels 198 are classified as the vehicle class 194c by using semantic segmentation; and/or (ii) the neighboring pixels 198 correspond to a three-dimensional object in the current frame, with the three-dimensional object being identified as a vehicle in the previous frame.

The vehicle external environment recognition apparatus 120 is thus prevented from misidentifying a specific object (e.g., a vehicle ahead of the vehicle 1) as floating matter and enables the vehicle 1 to escape severe damage from a collision with the specific object.

Three-Dimensional Object Specifying Process S216

The three-dimensional object specifying module 176 specifies a road surface ahead of the vehicle 1 by using the luminance images 180 and the distance image 182 with the floating pixels 196 and the neighboring pixels 198 having undergone the disparity invalidation. The three-dimensional object specifying module 176 then specifies a three-dimensional object located vertically above the specified road surface. For example, the three-dimensional object specifying module 176 considers that blocks at a predetermined distance (e.g., 0.3 m) or more from the road surface in the vertical direction are likely to correspond to a three-dimensional object that juts out the road surface in the vertical direction. From among the blocks that are likely to correspond to a three-dimensional object located vertically above the road surface, blocks located at the same relative distance from the vehicle 1 are selected and combined into a group by the three-dimensional object specifying module 176, which then specifies the group as a three-dimensional object.

Specific Object Determination Process S218

The specific object determination module 178 determines whether the three-dimensional object specified by the three-dimensional object specifying module 176 is a predetermined specific object (e.g., a vehicle ahead of the vehicle 1, a pedestrian, or a building). The determination may be made by using various known techniques, which will not be further elaborated here.

The vehicle external environment recognition apparatus 120 and the vehicle external environment recognition procedure, which have been described above, improve the accuracy of detecting floating matter and prevent the vehicle 1 from misidentifying the floating matter as a specific object and from being erroneously subjected to stop control or deceleration control. The neighboring pixels 198 that are close to the floating pixels 196 are recognized as floating matter by the second disparity invalidating module 172. This yields a further improvement in the accuracy of detecting floating matter. If there is a possibility that the neighboring pixels 198 do not correspond to floating matter, the invalidation canceling module 174 do not recognize the neighboring pixels 198 as floating matter. This enables the vehicle 1 to escape severe damage from a collision with a specific object.

This approach involves programs for causing a computer to operate as the vehicle external environment recognition apparatus 120 and a storage medium in which the programs are stored. Examples of the storage medium include computer-readable media, such as flexible discs, magneto-optical discs, read-only memory (ROM), compact discs (CDs), digital versatile discs (DVDs), and Blu-ray Discs (BDs). The programs herein refer to data processing means written in any desired language or described by using any desired method.

A preferred embodiment of the disclosure has been described with reference to the accompanying drawings. Needless to say, the disclosure is not limited to the embodiment. It is obvious that variations and modifications can be made by those skilled in the art without departing from the scope hereinafter claimed, and the variations and modifications also fall within the technical scope of the disclosure.

For example, an embodiment has been described in which the invalidation canceling module 174 cancels the invalidation of disparity associated with the neighboring pixels 198 when (i) the neighboring pixels 198 are classified as the vehicle class 194$c$ by using semantic segmentation; and/or (ii) the neighboring pixels 198 correspond to a three-dimensional object in the current frame, with the three-dimensional object being identified as a vehicle in the previous frame. In some embodiments, the invalidation canceling module 174 cancels the invalidation of disparity when the neighboring pixels 198 are recognized as an edge. This condition may be imposed in addition to or in place of the conditions (i) and (ii) mentioned above. The invalidation canceling module 174 determines the size of the edge by applying a filter in one direction (e.g., the horizontal direction or the vertical direction) or applying filters in both directions (e.g., the horizontal direction and the vertical direction) to the neighboring pixels 198 in the luminance images 180. In a case where the size of the edge is greater than or equal to a threshold value, the invalidation canceling module 174 recognizes it as an edge of a specific object (e.g., a vehicle). The invalidation canceling module 174 cancels the invalidation of disparity associated with the neighboring pixels 198 that are recognized as an edge of the specific object.

Each filter may be an array with three rows and three columns. For example, the array $\{\{-1, 0, 1\}, \{-2, 0, 2\}, \{-1, 0, 1\}\}$ is used as a filter Dx in the horizontal direction, and the array $\{\{-1, -2, -1\}, \{0, 0, 0\}, \{1, 2, 1\}\}$ is used as a filter Dy in the vertical direction. A predetermined block with three rows and three columns is herein denoted by L. The size of an edge in the horizontal direction is determined by multiplying an edge of the block L by the filter Dx in the horizontal direction (Dx×L), and the size of an edge in the vertical direction is determined by multiplying the edge of the block L by the filter Dy in the vertical direction (Dy×L). In a case where the root-mean-square value ($\sqrt{Lx^2 + Ly^2}$) that is the square root of the sum of squares of Lx and Ly is greater than or equal to a threshold value, the invalidation canceling module 174 cancels the invalidation of disparity associated with pixels included in the block L. Lx denotes the value obtained by multiplying the block L by the filter Dx in the horizontal direction, and Ly denotes the value obtained by multiplying the block L by the filter Dy in the vertical direction.

Detection of an edge in the horizontal direction and/or an edge in the vertical direction implies that the block L is less likely to correspond to floating matter, in which case the use of disparity associated with the block L is allowed. The edge detection may be performed by using various known techniques, which will not be further elaborated here.

The degree of certainty in prediction based on semantic segmentation may also be taken into consideration for cancellation of the invalidation of disparity. For example, it is determined whether the degree of certainty that the neighboring pixels 198 correspond to floating matter is less than a threshold value. The degree of certainty in prediction based on semantic segmentation is included in data that is input to softmax or sigmoid during arithmetic computations performed by the second class specifying module 168 or may be included in intermediate data obtained after softmax or sigmoid operations. For example, the invalidation canceling module 174 determines whether the degree of certainty about the neighboring pixels 198 in the luminance images 180 is less than or equal to a threshold value. The invalidation canceling module 174 cancels the invalidation of disparity associated with the neighboring pixels 198 for which it is determined that the degree of certainty is less than or equal to the threshold value.

When the degree of certainty that pixels of interest belong to the floating matter class 194$d$ is low, the pixels are less likely to correspond to floating matter, in which case the use of disparity associated with the pixels is allowed.

It is not required that the steps included in the vehicle external environment recognition procedure disclosed herein be performed chronologically in the order illustrated in the flowchart. The method may include parallel processing or subroutine processing.

The central control module 154 illustrated in FIG. 2 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the central control module 154 including the image acquiring module 160, the distance image generating module 162, the specific object tracking module 164, the first class specifying module 166, the second class specifying module 168, the first disparity invalidating module 170, the second disparity invalidating module 172, the invalidation canceling module 174, the three-dimensional object specifying module 176, and the specific object determination module 178. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 2.

The invention claimed is:

1. A vehicle external environment recognition apparatus for a vehicle, the vehicle external environment recognition apparatus comprising:
   imagers configured to capture luminance images in front of the vehicle;

at least one processor; and at least one memory coupled to the at least one processor, wherein the at least one processor is configured to operate in cooperation with at least one program stored in the at least one memory to execute processing that comprises:

generating a first distance image from the luminance images, wherein the distance image comprises pixels, each representing a depth of an object relative to the imagers, the depth being derived from parallax between corresponding points in the luminance images;

specifying, by using semantic segmentation, a floating matter class in at least one of the luminance images, wherein the floating matter class is a category assigned to pixels in the at least one luminance images that correspond to floating substances for which collision avoidance by the vehicle is unnecessary; and invalidating parallax associated with floating pixels that are included in the first distance image and belong to the floating matter class.

2. The vehicle external environment recognition apparatus according to claim 1, wherein the processing executed by the at least one processor further comprises invalidating parallax associated with neighboring pixels that are included in the first distance image and are located within a predetermined distance from the floating pixels.

3. The vehicle external environment recognition apparatus according to claim 2, wherein the processing executed by the at least one processor further comprises canceling the invalidation of the parallax associated with the neighboring pixels in a case where the neighboring pixels satisfy a predetermined cancellation condition.

4. The vehicle external environment recognition apparatus according to claim 3, wherein the predetermined cancellation condition is that the neighboring pixels are classified as a vehicle class by using semantic segmentation, wherein the vehicle class is a category assigned to pixels in the at least one of the luminance images that correspond to vehicles.

5. The vehicle external environment recognition apparatus according to claim 3, wherein the processing executed by the at least one processor further comprises:

specifying a three-dimensional object, based on the luminance images and the first distance image in which the parallax associated with some pixels is invalidated; and determining whether the three-dimensional object is a vehicle, and the predetermined cancellation condition is that the three-dimensional object was identified as a vehicle in a previous frame and the neighboring pixels correspond to the three-dimensional object in a current frame.

6. The vehicle external environment recognition apparatus according to claim 4, wherein the processing executed by the at least one processor further comprises:

specifying a three-dimensional object, based on the luminance images and the first distance image in which the parallax associated with some pixels is invalidated; and determining whether the three-dimensional object is a vehicle, and the predetermined cancellation condition is that the three-dimensional object was identified as a vehicle in a previous frame and the neighboring pixels correspond to the three-dimensional object in a current frame.

7. The vehicle external environment recognition apparatus according to claim 3, wherein the predetermined cancellation condition is that the neighboring pixels are recognized as an edge.

8. The vehicle external environment recognition apparatus according to claim 4, wherein the predetermined cancellation condition is that the neighboring pixels are recognized as an edge.

9. The vehicle external environment recognition apparatus according to claim 5, wherein the predetermined cancellation condition is that the neighboring pixels are recognized as an edge.

10. The vehicle external environment recognition apparatus according to claim 6, wherein the predetermined cancellation condition is that the neighboring pixels are recognized as an edge.

11. The vehicle external environment recognition apparatus according to claim 3, wherein the predetermined cancellation condition is that a degree of certainty of being floating matter in prediction based on semantic segmentation is less than a predetermined threshold value.

12. The vehicle external environment recognition apparatus according to claim 4, wherein the predetermined cancellation condition is that a degree of certainty of being floating matter in prediction based on semantic segmentation is less than a predetermined threshold value.

13. The vehicle external environment recognition apparatus according to claim 5, wherein the predetermined cancellation condition is that a degree of certainty of being floating matter in prediction based on semantic segmentation is less than a predetermined threshold value.

14. The vehicle external environment recognition apparatus according to claim 6, wherein the predetermined cancellation condition is that a degree of certainty of being floating matter in prediction based on semantic segmentation is less than a predetermined threshold value.

15. The vehicle external environment recognition apparatus according to claim 1, wherein the luminance images capture an object in front of the vehicle, the first distance image comprises pixels, each pixel comprising parallax information including a value of parallax derived from the luminance images, and the at least one processor is further configured to:

classify, using the semantic segmentation, pixels in the at least one of the luminance images into one of classes, wherein the classes include the floating matter class and a predetermined substance class being a category assigned to pixels in the at least one of the luminance images that correspond to predetermined substances excluding floating substances;

generate, in response to classifying the floating pixels into the floating matter class, a second distance image from the first distance image based on invalidating the parallax associated with the floating pixels in the first distance image;

identify one or more three-dimensional objects based on the second distance image such that no three-dimensional object is identified from the floating pixels; and execute control of the vehicle for the collision avoidance based on a position of the one or more three-dimensional objects.

16. The vehicle external environment recognition apparatus according to claim 15, wherein the predetermined substances are vehicles, and wherein each floating substances is (i) smoke that is a mass made of minute solid or liquid particles and is a product of combustion of a flammable substance or (ii) floating water vapor.

17. The vehicle external environment recognition apparatus according to claim 15, wherein the processing further comprises deriving positional information including a depth distance of the object from the imager based on the parallax information, generating the second distance image is further based on invalidating parallax associated with neighboring pixels in the first distance image, the one or more three-dimensional objects is identified based on the second distance image such that no three-dimensional object is identified from the neighboring pixels, the floating pixels includes a first floating pixel and a second floating pixel different from the first floating pixel, wherein the depth distance of the first floating pixel is minimum among the floating pixels, and the depth distance of the second floating pixel is maximum among the floating pixels, and each of the neighboring pixels has the depth distance between the depth distance of the first floating pixel and the depth distance of the second floating pixel.

\* \* \* \* \*